United States Patent [19]
Stephens et al.

[11] Patent Number: 6,149,160
[45] Date of Patent: *Nov. 21, 2000

[54] MECHANICAL SEALS ENHANCED WITH MICROSTRUCTURES

[75] Inventors: Lyndon S. Stephens; Kevin W. Kelly, both of Baton Rouge, La.

[73] Assignee: Board of Supervisors of Louisiana State University and Agricultural and Mechanical College, Baton Rouge, La.

[*] Notice: This patent issued on a continued prosecution application filed under 37 CFR 1.53(d), and is subject to the twenty year patent term provisions of 35 U.S.C. 154(a)(2).

[21] Appl. No.: 09/129,562

[22] Filed: Aug. 5, 1998

Related U.S. Application Data

[60] Provisional application No. 60/135,101, Aug. 8, 1997.

[51] Int. Cl.$^7$ ..................................... F16J 15/34
[52] U.S. Cl. ........................................ 277/399; 277/408
[58] Field of Search .................................. 277/399, 400, 277/408, 559, 571

[56] References Cited

U.S. PATENT DOCUMENTS

| | | | |
|---|---|---|---|
| 3,572,730 | 3/1971 | Otto et al. | 277/96 |
| 3,586,340 | 6/1971 | Otto et al. | 277/96 |
| 4,047,984 | 9/1977 | Belke et al. | |
| 4,533,815 | 8/1985 | Ecer. | |
| 4,834,400 | 5/1989 | Lebeck. | |
| 5,447,316 | 9/1995 | Matsui. | |
| 5,575,486 | 11/1996 | Edling et al. | |
| 5,681,661 | 10/1997 | Kelly | 428/601 |

FOREIGN PATENT DOCUMENTS

| | | |
|---|---|---|
| WO 97/29223 | 3/1996 | WIPO. |
| WO 96/07954 | 8/1997 | WIPO. |

OTHER PUBLICATIONS

U.S. application No. 09/091,698, Kelly, filed Feb. 1997.
Busch–Vishniac, I. et al., "Smart Hydrodynamic Bearings with Embedded MEMS Devices," Internet reference, http://www.me.utexas.edu/~microbot/smartbearings.html(1997).

*Primary Examiner*—Anthony Knight
*Assistant Examiner*—John L. Beres
*Attorney, Agent, or Firm*—John H. Runnels

[57] ABSTRACT

Properties of mechanical bearings and mechanical seals can be significantly improved by covering the load-bearing surfaces with fields of high aspect ratio microstructures (HARMs), such as microchannels or microposts. The HARMs can substantially enhance heat transfer capability and lubricant flow. The present invention uses microstructures and micro-channels manufactured by a modified LIGA process to enhance the performance of load bearing surfaces. Benefits include reduced operating temperatures, precise metering of lubricant flow to all affected surfaces, increased reliability, increased life, higher maximum rotational speed, and the ability of the seal or bearing to run "dry," that is, without periodic re-application of lubricant. The invention may be used with a variety of bearings and mechanical seals, including for example ball bearings, roller bearings, journal bearings, air bearings, magnetic bearings, single mechanical seals, double mechanical seals, tandem mechanical seals, bellows, pusher mechanical seals, and all types of rotating and reciprocating machines. Improved cooling jackets are also disclosed, for use with bearings, seals, or other applications.

9 Claims, 6 Drawing Sheets

PRIOR ART

MECHANICAL SEALS ENHANCED WITH MICROSTRUCTURES

The benefit of the Aug. 8, 1997 filing date of provisional application Ser. No. 60/135,101 is claimed under 35 U.S.C. § 119(e)

The development of this invention was funded by the Government under grant DABT63-95-C-0020 awarded by the Defense Advanced Research Projects Agency. The Government has certain rights in this invention.

This invention pertains to bearings and seals with improved mechanical properties, and to improved cooling or heating jackets for heat transfer in bearings, seals, and other devices.

Seals and bearings are among the most widely used components in industry. There is a continuing need for seals and bearings that can operate under higher loads, higher speeds, or higher temperatures. There is a particular need for an inexpensive, "dry-running" mechanical seal, one that does not require periodic re-application of lubricant. Previous dry-running mechanical seals have used a buffer gas instead of a liquid to lubricate the seal faces. However, existing dry-running gas seals are either very expensive, or are designed only for temporary, "backup" uses; and in either case are not usable in some applications.

Three more-or-less distinct lubrication regimes are encountered in typical load-bearing applications: hydrodynamic lubrication, elasto-hydrodynamic lubrication, and boundary lubrication. A given load-bearing application may involve one or more of these regimes.

Hydrodynamic lubrication is the best understood and most commonly encountered regime. In this regime the sliding surfaces are large conforming areas that produce a converging wedge of fluid as they move past one another. The sliding surfaces remain separated by the pressure within the converging wedge. However, because the sliding surfaces are conforming areas, the fluid pressure is sufficiently low that the surfaces do not deform substantially under the load caused by this pressure. Typically, fluid pressures are less than 5 Mpa and film thicknesses are greater than 1 $\mu$m. FIGS. 1(a) and 1(b) illustrate two of the many types of load bearing applications that rely on hydrodynamic lubrication, a stator-journal bearing comprising stator 2 and journal 4, and a shaft-thrust bearing comprising shaft 6 and thrust bearing 8, respectively. A few of the many other examples of load bearing applications that rely on hydrodynamic lubrication include squeeze film, journal, slider, and hydrostatic bearings; and dry-running "extended life" gas seals (the last item as distinguished from backup-use-only, dry-running gas seals that are not hydrodynamically lubricated, and that have typical life spans of a few hours).

Elasto-hydrodynamic lubrication occurs when the mating bearing surfaces are non-conforming areas that produce very high fluid film pressures. This lubrication regime is similar to hydrodynamic lubrication, except that the fluid pressures are sufficiently high to deform the mating bearing surfaces. The surfaces typically experience some rolling contact and some sliding contact with one another. This contact, coupled with the fluid viscosity and geometry, can generate very high fluid pressures. These high pressures increase the viscosity of the lubricant to a point at which it behaves almost as a solid. Typically, fluid pressures are in the range 0.5–3.0 Gpa, and film thicknesses are greater than 0.1 $\mu$m. FIGS. 2(a) and 2(b) illustrate a roller bearing 10 and a ball bearing 12, respectively, two of the many load bearing applications that rely on elasto-hydrodynamic lubrication.

Boundary lubrication occurs when the lubricant film between the two bearing surfaces is very small, and significant solid-to-solid contact results. Boundary lubrication is produced by very thin surface lubricant films (typically of molecular size). Frictional resistance and wear (bearing life) are determined by the chemical and physical properties of the solids and lubricant at the interface. Boundary lubrication typically occurs in applications where sliding speeds are low and loads are very high. The maximum film thicknesses are 1–10 nm.

Under any of these lubrication regimes, the parameters that determine the performance of the load bearing surface include the coefficient of friction, wear, load bearing capacity, and temperature of the surfaces. Bearing and seal designs have historically focused upon enhancing these properties. For example, porous metal bearings and porous sintered carbide seals faces have been formed by etching processes to create pores that can store lubricant via capillary action. See, e.g., C. Cusano, "Lubrication of Porous Journal Bearings," *Journal of Lubrication Technology*, vol. 94, pp. 69–73 (1972); R. Divikar, "Sintered Silicon Carbides with Controlled Porosity for Mechanical Face Seals Applications," *Lubrication Engineering*, vol. 50, pp. 75–80 (1993). The lubricant is then released when the temperature increases, creating a self-lubricating surface.

Triangular, low aspect ratio asperities have been etched into surfaces to store and pump lubricant to different regions of certain types of bearings and seals. See U.S. Pat. Nos. 3,572,730 and 3,586,340. The aspect ratios of these triangular asperities were very low: the minimum horizontal dimension was said to be 0.005 inches, and the maximum vertical dimension 500 microinches. Thus the maximum aspect ratio of an asperity consistent with the teachings of these patents is: maximum height/minimum width=0.0005/0.005=0.1. (In fact, the patents teach that the, maximum depth of 500 microinches is undesirable, because excessive amounts of lubricant leak through until the asperities wear down to 100 microinches. Thus these patents affirmatively suggest that superior results are obtained with aspect ratios significantly lower than 0.1.)

Other research has investigated the potential use of micro-structures etched into the surface of hydrodynamic bearings to improve load capacity, stiffness and damping of the bearing. See I. Busch-Vishniac, I. et al., "Smart Hydrodynamic Bearings with Embedded MEMS Devices," Internet reference, http ://www.me.utexas.edu/~microbot/smartbearings.html (1997).

It has been discovered that the properties of mechanical bearings and mechanical seals can be significantly improved by covering the load-bearing surfaces with large fields of high aspect ratio microstructures (HARMs), such as microchannels or microposts. The HARMs can substantially enhance heat transfer capability and lubricant flow. Benefits include reduced operating temperatures, precise metering of lubricant flow to all affected surfaces, increased reliability, increased life, higher maximum rotational speed, and the ability of the seal or bearing to run "dry," that is, without periodic re-application of lubricant.

The invention may be used with a variety of bearings and mechanical seals, including for example ball bearings, roller bearings, journal bearings, air bearings, magnetic bearings, single mechanical seals, double mechanical seals, tandem mechanical seals, bellows, pusher mechanical seals, and all types of rotating and reciprocating machines. The invention may be used in regimes of hydrodynamic lubrication, elasto-hydrodynamic lubrication, and boundary lubrication.

A modification of these structures results in improved cooling jackets for use with bearings, seals, or other objects where improved heat transfer for cooling (or heating) is needed.

Appropriate aspect ratios for the microstructures, that is, the ratio of their height to their diameter, depends on the application for which they are being used. For example, for mechanical seals the aspect ratio should be between about 0.5 and about 50, preferably between about 1 and about 10. For fluid bearings (i.e., rolling element or journal bearings with fluid lubricant), or for cooling jackets for fluid bearings, the aspect ratio should be between about 0.5 and about 75, preferably between about 1 and about 15. For rolling element bearings, the aspect ratio should be between about 0.2 and about 1.0, preferably between about 0.25 and about 0.5. For fault-tolerant rolling element bearings with solid lubricants, the aspect ratio should be between about 0.2 and about 5, preferably between about 0.25 and about 0.5. For journal or thrust bearings with solid lubricants, the aspect ratio should be between about 0.2 and about 20, preferably between about 0.25 and about 1.0.

CONSTRUCTION OF LARGE HARMS

Figure 1A:
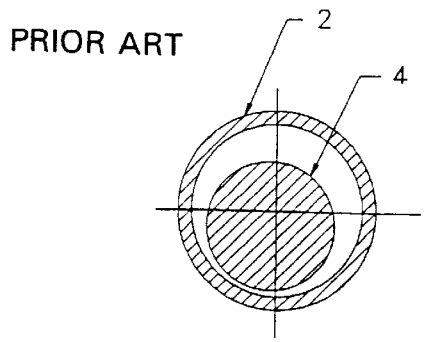
FIGS. 1($a$) and 1($b$) illustrate a conventional stator-journal bearing and a conventional thrust bearing, respectively.
Figure 1B:
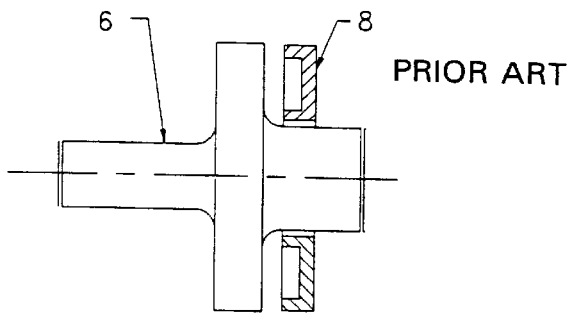
Figures 2A, 2B:
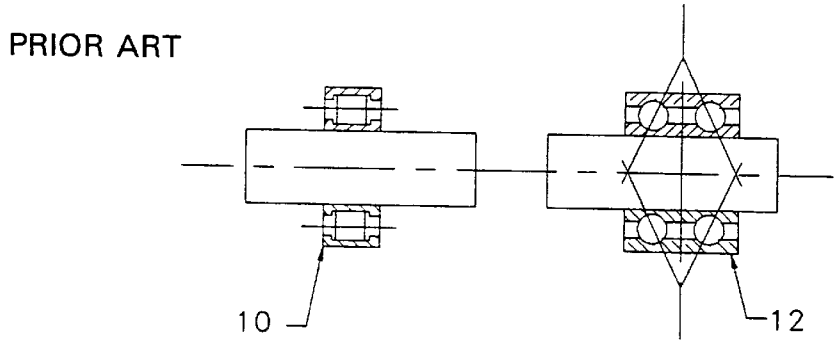
FIGS. 2($a$) and 2($b$) illustrate a conventional roller bearing and a conventional ball bearing, respectively.

Large fields of HARMs have been fabricated using a modified LIGA process. "LIGA" is a German acronym for a process involving X-ray lithography, electroplating, and plastic molding. As shown in FIGS. 3($a$)–($d$), a typical LIGA procedure is based on bonding a sheet of poly(methylmethacrylate) (PMMA) X-ray resist 104 to a conductive metal substrate 102. The thickness of the PMMA 104 is typically equal to the desired height of the microstructure. The PMMA/metal laminate is positioned behind a mask 108, and exposed to a collimated X-ray beam 106 as shown in FIG. 3($a$). The molecular weight of the PMMA 104 decreases in the irradiated areas. After exposure, the PMMA sheet 104 is immersed in a developer that dissolves the irradiated areas with low molecular weights, as shown in FIG. 3($b$). The resulting PMMA template 104 is then used to electroplate microstructures 110 on the metal substrate 102, as shown in FIG. 3($c$). After electroplating is complete, the remaining PMMA 104 is removed (dissolved), resulting in a metal sheet 102 covered with microstructures 110, as shown in FIG. 3($d$). The microstructure-covered sheet of FIG. 3($d$) may represent the final product, or it may serve as a mold that can be inserted into an injection molding machine to repeatedly reproduce a secondary polymer template with a geometry identical to the primary PMMA template.

Figure 4:
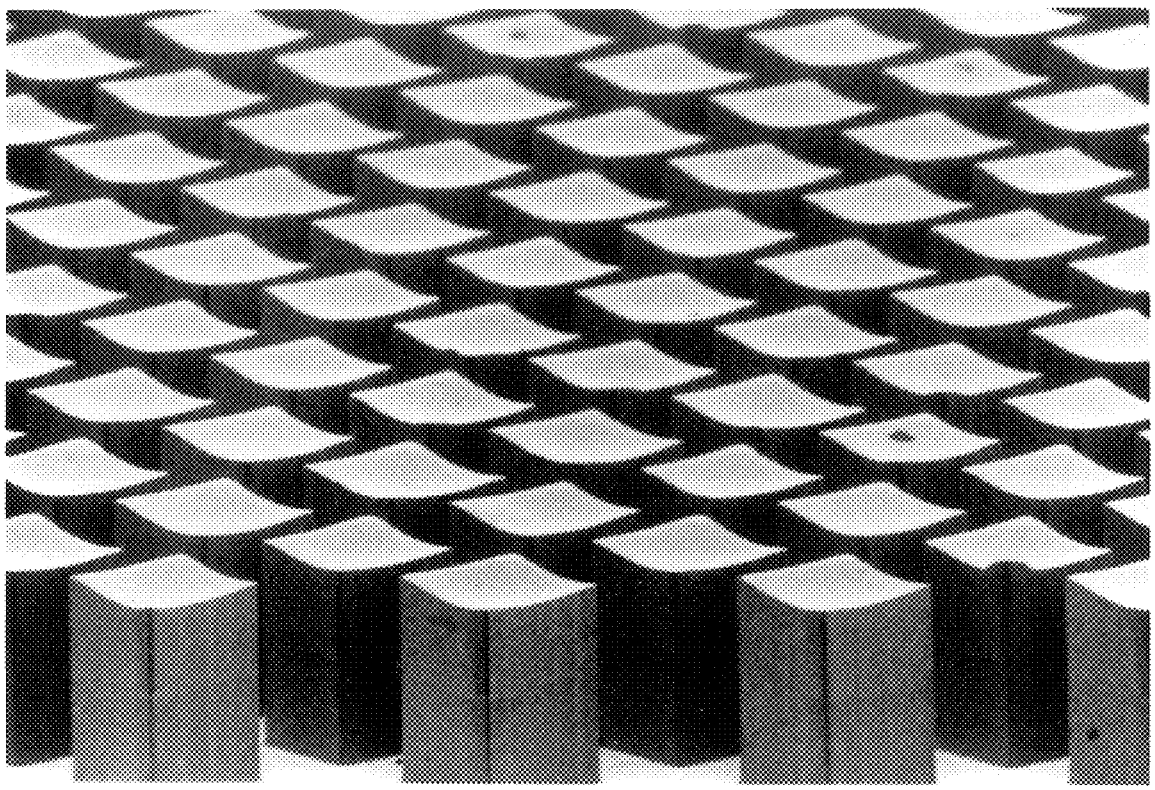
FIG. 4 is a photomicrograph of a field of square nickel posts fabricated with the LIGA process.
Figure 5:
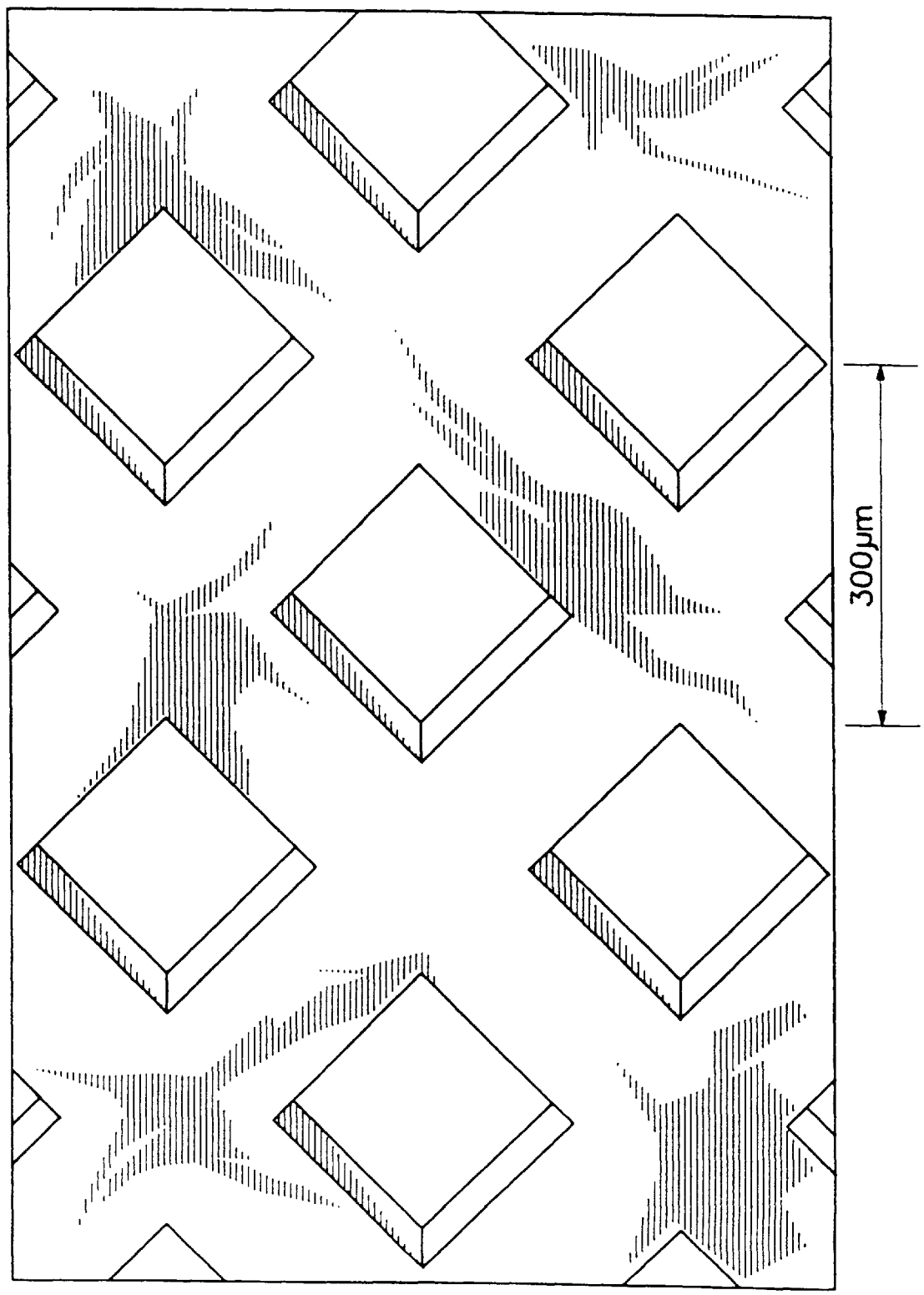
FIG. 5 is a drawing of a 300 $\mu$m-thick sheet of PMMA exposed with collimated X-rays through a wire screen mask, and then developed.

For example, the LIGA process has been used to fabricate nickel HARMs of various configurations. The field of square nickel posts shown in the photograph of FIG. 4 was fabricated using the standard LIGA process. These posts have a height of 300 $\mu$m, with a cross section of 170 $\mu$m×170 $\mu$m. A stainless steel wire screen mask, manufactured using laser technology, was used to pattern a sheet of PMMA. The wire-to-wire spacing of the screen was 300 $\mu$m in both weave directions, with a wire diameter of 125 $\mu$m. The direct result of the lithography process using this wire screen mesh mask was the 300 $\mu$m-thick sheet of PMMA illustrated in FIG. 5 (drawn from a photomicrograph). A nickel substrate, bonded to the PMMA throughout the lithography process, then served as the cathode during an electroplating process in which the square "through-holes" in the PMMA were filled with nickel. After the electroplating step was completed, the PMMA was dissolved in acetone, leaving only the square nickel posts shown in FIG. 4.

Modifications to the LIGA process have made it feasible to build fields of high aspect ratio microstructures (HARMs) on metal surfaces. It is sometimes preferable to lithographically pattern the resist without first bonding it to a conductive substrate. These "free standing" sheets of resist, perforated with high aspect ratio through-holes, can be clamped or stretched over a metal surface, and then used as a template to electroplate metal microstructures onto the metal surface. For example, microstructures have been grown on the circumference of a 1.0 cm radius right circular cylinder shaft by first covering the shaft with a sheet of PMMA patterned with through holes, and then electroplating in the through holes.

For further details concerning the fabrication of HARMs, covering macroscopic surfaces with HARMs, the use of HARMs for heat transfer, and other aspects of the manufacture and uses of HARMs generally, see the following disclosures, each of which is incorporated by reference: U.S. patent application Ser. No. 08/757,215, filed Nov. 27, 1996; U.S. patent application Ser. No. 08/599,151, filed Feb. 9, 1996; U.S. patent application Ser. No. 08/295,898, U.S. national stage under 35 U.S.C. § 371 entered Jul. 18, 1996; Patent Cooperation Treaty published international application No. WO 96/07954, international publication date Mar. 14, 1996; and Patent Cooperation Treaty Ser. No. PCT/US97/01578, international filing date Feb. 5, 1997, international publication expected on or after Aug. 9, 1997.

LUBRICATION ENHANCEMENTS IN LOAD BEARING APPLICATIONS USING HARMS

Appropriately designed HARMs may be used to enhance heat transfer and the efficient supply of lubricant to load bearing regions of macroscopic surfaces. HARMs applied to macroscopic load bearing surfaces may be used for one or more of three purposes: (1) heat sink/heat source; (2) fluid lubricant storage and distribution; and (3) solid lubricant storage and distribution applications.

The lubricant may be supplied from an external source under pressure, or it may be supplied from an internal, sealed source. Rotation or other motion of the seal supplies pumping action to distribute the lubricant across the affected faces. The lubricant is typically a liquid, but alternatively may be a gas or a solid lubricant.

HEAT SINK/SOURCE APPLICATIONS

Both load-bearing and non-load-bearing surfaces of bearings and seals may be covered with HARMs to enhance heat transfer. Reducing the operating temperature of the load bearing surface under a given set of operating conditions (speed, lubricant grade, etc.) has significant benefits in all three lubrication regimes previously described. The cooling (or heating) jackets described below may also be used in applications other than on bearings and seals, where an efficient, compact heat transfer apparatus is needed.

As applied to hydrodynamic journal and thrust bearings, important advantages of the novel cooling jacket are higher bearing speed and load capacity; more stable lubricant viscosity; greater heat transfer rates; increased (and generally more stable) stiffness and damping properties. The principal advantage in elasto-hydrodynamic and boundary lubricated journal and thrust bearings will be higher speed capability. The novel cooling jackets are able to draw heat from the fluid more quickly and efficiently; are more compact as compared to conventional cooling jackets; allow increased speed (capacities; and promote stable lubricant viscosity, stiffness, and damping under conditions of use.

Figure 7A:
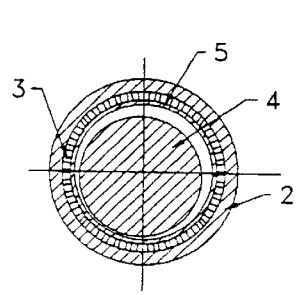
FIGS. 7($a$) and 7($b$) illustrate hydrodynamic journal and thrust bearings, respectively, constructed with HARMs.
Figure 7B:
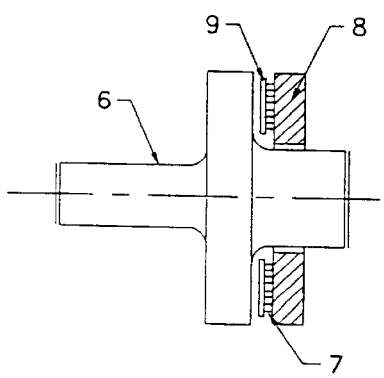
Figure 3A:
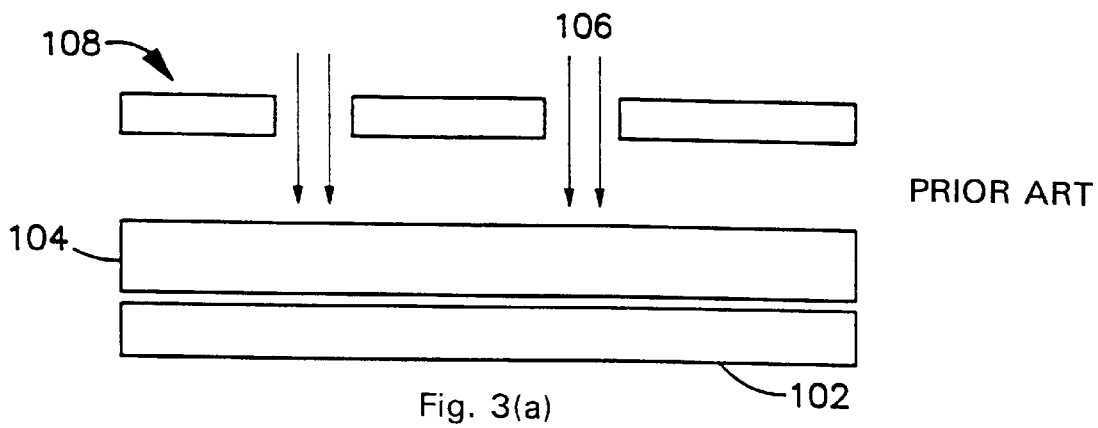
FIGS. 3($a$)–($d$) illustrate the LIGA process.
Figure 3B:
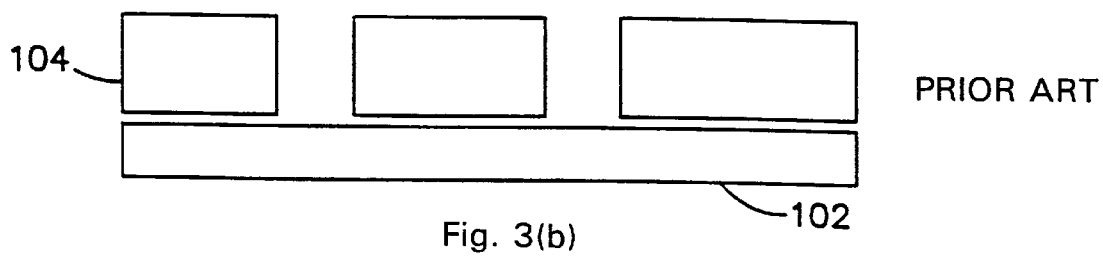
Figure 3C:
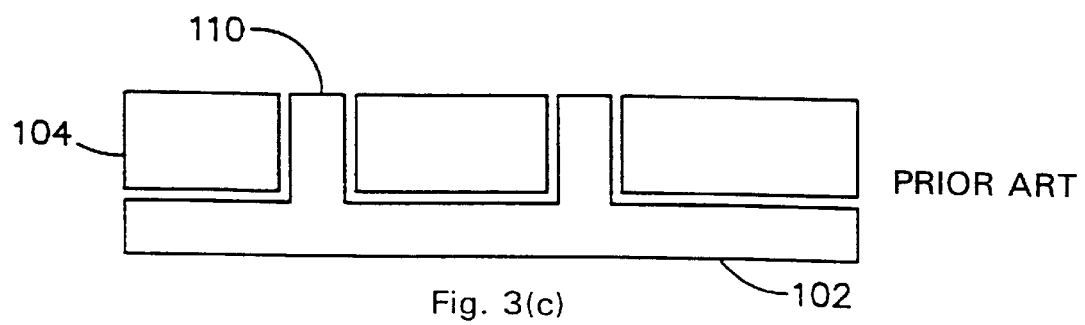
Figure 3D:
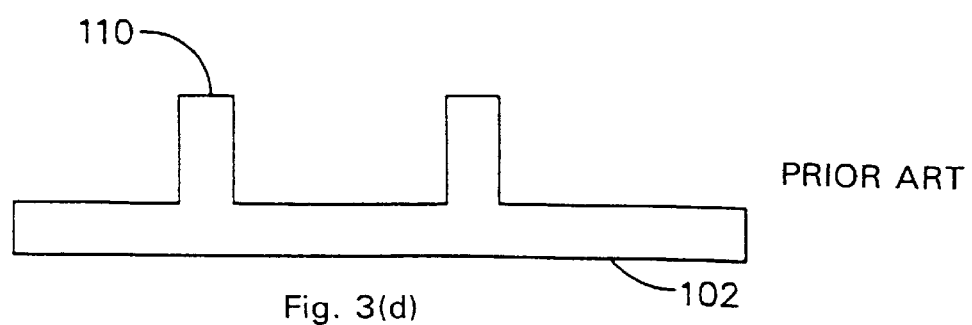

For example, hydrodynamic journal and thrust bearing surfaces can be constructed with HARMs to include an integral, high thermal capacity cooling jacket as illustrated in FIGS. 7(a) and 7(b), respectively. This surface/cooling jacket can be manufactured, for example, by the following process: (1) construct outer cylinder (or stator) 2 and drill coolant supply and drain holes into the outer surface of outer cylinder 2 (not illustrated); (2) grow HARMs 3 onto the inner surface of outer cylinder 2, using the modified LIGA process; (3) overplate the HARMs with a solid surface of metal (e.g., chromium, nickel); and (4) attach the bearing material (e.g. babbit, poly(tetrafluorethylene) (PTFE) sleeve, porous bronze) over the plating to form inner cylinder 5, which is the load bearing surface. The process is generally similar for hydrodynamic thrust-type bearings (FIG. 7(b)), except that the outer cylinder 2 is replaced with a flat thrust disk 8, onto which HARMs 7 are formed, followed by inner thrust surface 9. The HARMs may, for example, be made of nickel or a nickel alloy or a ceramic, have a height between about 50 $\mu$m and 1000 $\mu$m, have an aspect ratio between about 10 and about 30, and cover about 10–70% of the surface, i.e., leave about 30–90% of the surface as channels. In use, a refrigerant (whose composition may be any of a number of commonly-used industrial refrigerants) circulates through the cooling jacket in the channels between the HARMs, carrying away beat rapidly.

An alternative method for manufacturing a cooling jacket can be used for journal type bearings: (1) construct the inner cylinder and attach the bearing material (e.g., babbit, PTFE, porous bronze); (2) grow microstructures onto the outer surface of the inner cylinder using LIGA; (3) attach a second, outer cylinder over the microstructures using a shrink fit; and (4) drill supply and drain holes in the second cylinder.

Figure 8:
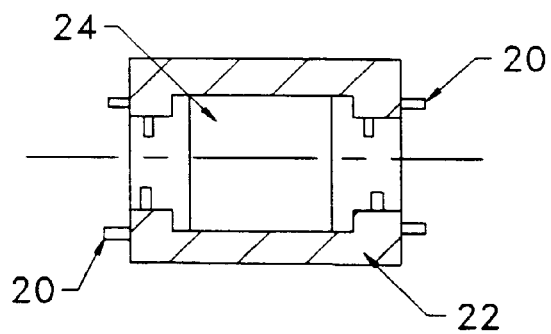
FIG. 8 illustrates schematically the use of HARMs on auxiliary surfaces of a roller bearing.

In addition to (or in lieu of) constructing high thermal capacity cooling jackets integral to the bearings, HARMs may be used on "auxiliary" surfaces of bearings and seals to enhance the heat transfer from these surfaces to the environment. Again, this heat transfer results in a cooler running bearing or seal, and increases life, reliability, and speed capability. FIG. 8 illustrates schematically tie use of HARMs 20 on auxiliary surfaces 22 for a roller bearing 24.

FLUID LUBRICANT STORAGE AND DISTRIBUTION

Figure 9A:
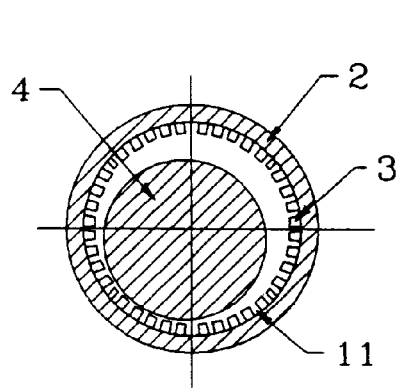
FIGS. 9($a$) and 9($b$) illustrate hydrodynamic journal and thrust bearings, respectively, constructed with HARMs.
Figure 9B:
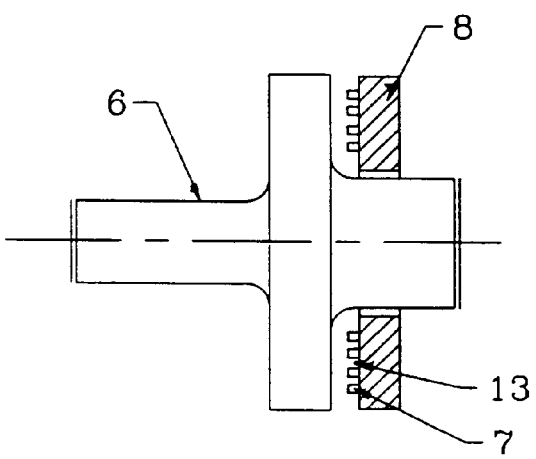

An important factor in the reliability and operating range of bearing and sealing applications is the uniform distribution of a fresh supply of lubricant across the load-bearing or sealing surfaces. Appropriately designed HARMs enhance the efficient supply of lubricant to these surfaces, in this case without substantial overplating of the HARMs. The HARMs also have the beneficial side effect that they enhance heat transfer through two mechanisms: (1) the supply of lubricant reduces the Coefficient of friction, thereby reducing heat generation and preventing "hot spots"; and (2) due to their geometry, the HARMs cool more efficiently than a bulk surface of comparable size. The HARMs create a high density surface of posts, with sufficient strength to support the load, and with highly uniform channels that may be used to distribute lubricant uniformly across the surface. FIGS. 9(a) and 9(b) depict such HARMs-covered surfaces for journal bearings and thrust bearings, respectively. The reference numerals in these figures are as for prior figures, with reference numerals 11 and 13 depicting lubricant channels between HARMs. The cross-section of the posts can be any of a variety of geometries that, when coupled with the relative motion of the two surfaces, yields a pumping action to distribute lubricant to different areas around the bearing. The posts are regularly spaced, and the individual posts may for example have a cross section that is a square, a rectangle, a triangle, a regular hexagon, a circle, a blade having a curved surface of the same shape as that of larger impeller blades used in pumps known in the art, or an element of a "herring-bone" pattern. The last, an impeller blade shape, could be particularly effective as a pump. The pumping action reduces the coefficient of friction between the two surfaces, and increases hydrodynamic action in mixed lubrication. These improvements are of special importance in mixed and boundary lubricated devices such as rolling element bearings, mechanical seals, and dry-rubbing bearings. After the HARMs are formed, it is preferred that the outer surface of the HARMs be finished using a lapping or other process to achieve a smooth conjunction between surfaces.

SOLID LUBRICANT STORAGE AND DISTRIBUTION APPLICATIONS

There is a particular unfilled need for fault-tolerant, lubricated bearings. For example, on a military aircraft that may suffer loss of lubricant to the engine bearings, it would be highly desirable that the bearings continue to function to avoid engine failure. Other examples where fault-tolerant bearings would be desirable are canned motor pumps and magnetically coupled pumps, which often run "dry" and fail due to loss of bearing lubrication. In these and other examples, the life of the bearings without fresh fluid lubrication can be critical. A novel solution to this problem is to cover the load-bearing surfaces with HARMs as described above, and to fill the channels between HARMs with a solid lubricant such as graphite, oil-filled bronze, soft babbit, and the like. The surface is then self-lubricating in the event of fluid lubrication failure. Alternatively, in some applications the seal or bearing may be intentionally dry-running from the outset. FIG. 9 also illustrates these types of surfaces, which may be generated by the following process: (1) construct an outer cylinder; (2) grow HARMs onto the surface of the outer cylinder using LIGA; (3) finish the HARMs surface using a lapping (or similar) process to achieve a smooth conjunction; (4) pour the solid lubricant (which has a low melting point compared to that of the HARMs) into the channels; and (5) finish the solid, composite surface using a lapping (or similar) process to achieve a smooth conjunction.

EXAMPLES

In a prototype embodiment, HARMs were grown on a seal face in the shape of a ring with a 10-centimeter outer diameter and a 6-centimeter inner diameter. The mask for X-ray exposure was a wire screen mesh with wires 110 μm in diameter, with a center-to-center wire spacing of 270 μm. The resulting mask comprised a membrane, opaque to X-rays except where the wire screen patterned the collimated X-ray radiation. A collimated, hard X-ray source lithographically patterned a 12 centimeter by 12 centimeter PMMA sheet using this mask.

Figure 6:
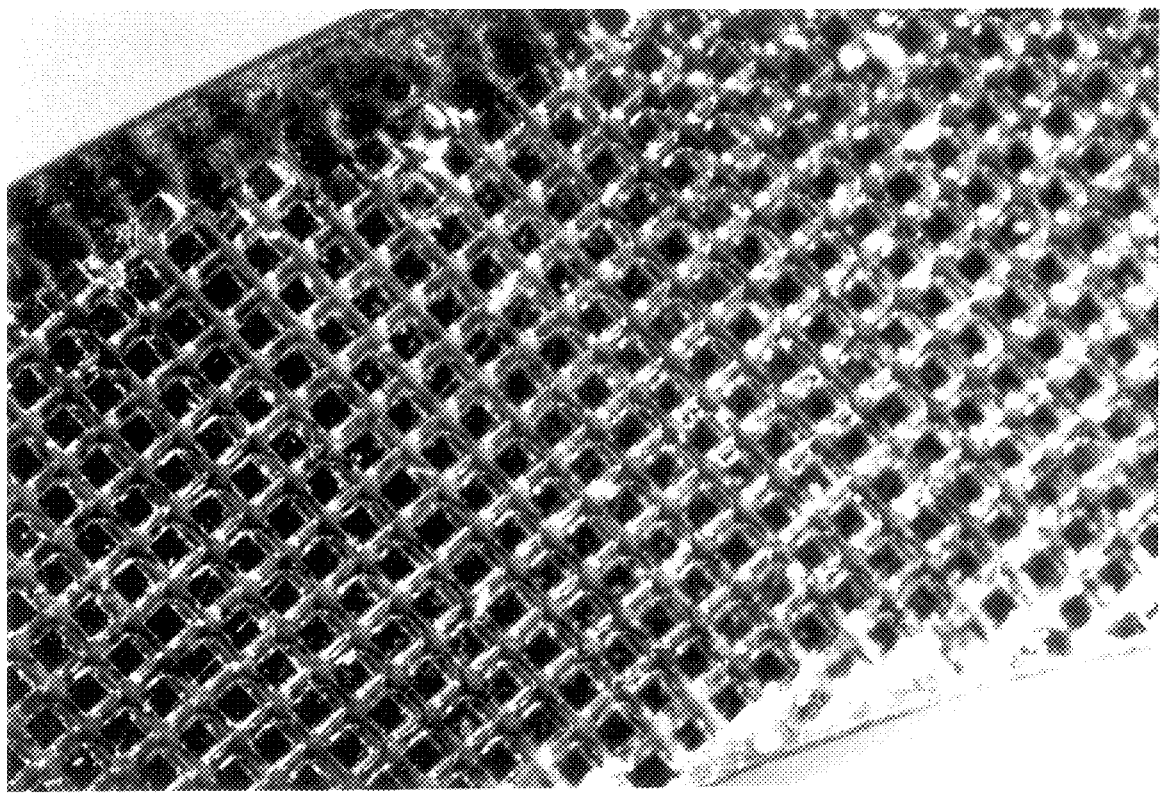
FIG. 6 depicts a photomicrograph of nickel HARMs upon a seal face.

The sheet of lithographically patterned PMMA was directly applied to the conductive surface of a seal, taking care to align the patterned region of the PMMA with the surface of the seal face where microstructures were desired. FIG. 6 depicts a photomicrograph of the nickel HARMs grown upon the seal face. The PMMA served as a template to pattern the growth of metal microstructures during electroplating, which continued until the through holes in the PMMA were filled with electroplated metal. The microstructures were then given a smooth, planar surface with a polishing wheel, and the PMMA was dissolved in acetone, leaving the microstructure-covered seal surface.

In large-scale operations, rather than use the lithographically-pattered sheet of PMMA directly as a template to electroplate microstructures on a seal face, the lithographically-pattered PMMA sheet is instead used to fabricate a mold. The mold is then used to mass-produce polymer sheets through injection molding or embossing, each of which has the same pattern of through-holes as the original, lithographically-patterned PMMA sheet. The molded sheets are used as disposable templates to electroplate microstructures onto the seal surfaces. By fabricating such a mold, the need for access to a collimated X-ray source is greatly reduced, thereby reducing the cost of the process.

Typical desirable properties in a mechanical seal face include the following: (1) a hardness at least 20% higher than any abrasive in the fluid being pumped, to prevent abrasive wear; (2) a differential hardness of about 20% between the mating seal faces to prevent galling (i.e., cold welding) to each other; (3) a high thermal conductivity to remove heat rapidly from each face; (4) a high differential in the elastic moduli of the two faces, to allow the more elastic face to conform to the stiffer face and provide a better seal; (5) a very low coefficient of thermal expansion to prevent distortion of the faces; and (6) a small dry friction coefficient between the seal pair faces to limit heat generation. Items (4) and (5) in the preceding list may be less important for surfaces covered with HARMs.

To date, the most widely used face materials in mechanical seals have been silicon carbide or tungsten carbide for the "hard" face, and standard carbon graphite for the "soft" face, as these materials satisfy the properties listed above. Some seal designs have also used bronze rings. The material requirements for HARMs in mechanical seal applications should be similar. In particular, in the prototype embodiment HARMs will be placed on a nickel or nickel alloy face, and the other face will be carbon graphite, silicon carbide, tungsten carbide, or bronze.

The complete disclosures of all references cited in this specification are hereby incorporated by reference. In the event of an otherwise irreconcilable conflict, however, the present specification shall control.

We claim:

1. A mechanical seal comprising at least at two faces that seal to one another, a first face and a second face, wherein said first face:

(a) comprises a plurality of microstructures covering between about 10% and about 70% of the area of said first face, wherein each of said microstructures comprises a distal end and a proximal end;

(b) the proximal end of each of said microstructures is connected to said first face;

(c) the distal end of each of said microstructures is not connected to a shield, wall, or other object that inhibits heat transfer;

(d) the distance between the proximal and distal ends of each of said microstructures is between about 0.05 mm and about 1.0 mm, and the aspect ratio of each of said microstructures is between about 0.5 and about 50; wherein the aspect ratio of a microstructure is the ratio of the distance between the proximal end and the distal end to the characteristic dimension of the microstructure; wherein the characteristic dimension of the microstructure is the diameter of the microstructure in a plane perpendicular to a line between the proximal end and the distal end of the microstructure; and (e) wherein, if a lubricant is applied to said first face, then in the presence of a load between said first and second faces, said microstructures and the spaces between adjacent microstructures are adapted to cause the lubricant to flow to substantially all portions of said first face subject to the load;

whereby heat transfer at the interface of said first and second faces is substantially greater than would be the heat transfer between otherwise identical faces lacking said microstructures; and whereby, if a lubricant is applied to said first face, the friction between said first and second faces is substantially less than would be the friction between otherwise identical faces lacking said microstructures.

2. A mechanical seal as recited in claim 1, wherein each of said microstructures has a rectangular cross section in a direction perpendicular to a line between the proximal end and the distal end of said microstructure.

3. A mechanical seal as recited in claim 1, wherein each of said microstructures has a square cross section in a direction perpendicular to a line between the proximal end and the distal end of said microstructure.

4. A mechanical seal as recited in claim 1, wherein each of said microstructures has a circular cross section in a direction perpendicular to a line between the proximal end and the distal end of said microstructure.

5. A mechanical seal as recited in claim 1, wherein each of said microstructures has an impeller blade cross section in a direction perpendicular to a line between the proximal end and the distal end of said microstructure.

6. A mechanical seal as recited in claim 1, wherein the aspect ratio of each of said microstructures is between about 1 and about 10.

7. A mechanical seal as recited in claim 1, wherein said seal is adapted to hold a sealed liquid lubricant that need not be replenished when said seal is in use.

8. A mechanical seal as recited in claim 1, wherein said seal is adapted to hold a sealed solid lubricant that need not be replenished when said seal is in use.

9. A seal comprising at least at two surfaces that seal to one another, a first surface and a second surface, wherein said first surface:

(a) comprises a plurality of microstructures covering between about 10% and about 70% of the area of said first surface, wherein each of said microstructures comprises a distal end and a proximal end;

(b) the proximal end of each of said microstructures is connected to said first surface;

(c) the distal end of each of said microstructures is not connected to a shield, wall, or other object that inhibits heat transfer;

(d) the distance between the proximal and distal ends of each of said microstructures is between about 0.05 mm and about 1.0 mm, and the aspect ratio of each of said microstructures is between about 0.5 and about 75; wherein the aspect ratio of a microstructure is the ratio of the distance between the proximal end and the distal end to the characteristic dimension of the microstructure; wherein the characteristic dimension of the microstructure is the diameter of the microstructure in a plane perpendicular to a line between the proximal end and the distal end of the microstructure; and (e) wherein, if a lubricant is applied to said first surface, then in the presence of a load between said first and second surfaces, said microstructures and the spaces between adjacent microstructures are adapted to cause the lubricant to flow to substantially all portions of said first surface subject to the load;

whereby heat transfer at the interface of said first and second surfaces is substantially greater than would be the heat transfer between otherwise identical surfaces lacking said microstructures; and whereby, if a lubricant is applied to said first surface, the friction between said first and second surfaces is substantially less than would be the friction between otherwise identical surfaces lacking said microstructures.

\* \* \* \* \*